United States Patent
Hendel et al.

(10) Patent No.: US 9,166,927 B2
(45) Date of Patent: Oct. 20, 2015

(54) NETWORK SWITCH FABRIC DISPERSION

(75) Inventors: Ariel Hendel, Cupertino, CA (US); Bruce Kwan, Sunnyvale, CA (US); Puneet Agarwal, Cupertino, CA (US); Mohan Kalkunte, Saratoga, CA (US)

(73) Assignee: BROADCOM CORPORATION, Irvine, CA (US)

( * ) Notice: Subject to any disclaimer, the term of this patent is extended or adjusted under 35 U.S.C. 154(b) by 1225 days.

(21) Appl. No.: 12/255,488

(22) Filed: Oct. 21, 2008

(65) Prior Publication Data

US 2010/0097934 A1    Apr. 22, 2010

(51) Int. Cl.
| | | |
|---|---|---|
| *H04L 12/933* | (2013.01) | |
| *H04L 12/715* | (2013.01) | |
| *H04L 12/713* | (2013.01) | |
| *H04L 12/931* | (2013.01) | |
| *H04L 12/939* | (2013.01) | |
| *H04L 12/46* | (2006.01) | |

(52) U.S. Cl.
CPC ............ *H04L 49/1515* (2013.01); *H04L 45/04* (2013.01); *H04L 45/586* (2013.01); *H04L 49/505* (2013.01); *H04L 49/552* (2013.01); *H04L 12/4641* (2013.01)

(58) Field of Classification Search
CPC ............ H04L 12/4641; H04L 49/1515; H04L 49/505; H04L 49/552; H04L 45/04; H04L 45/486
USPC ....................................................... 370/237
See application file for complete search history.

(56) References Cited

U.S. PATENT DOCUMENTS

| | | | | |
|---|---|---|---|---|
| 2002/0057651 | A1* | 5/2002 | Roberts ......................... | 370/235 |
| 2002/0071450 | A1* | 6/2002 | Gasbarro et al. ............. | 370/463 |
| 2003/0095554 | A1* | 5/2003 | Shimizu ................... | 370/395.53 |
| 2005/0265255 | A1* | 12/2005 | Kodialam et al. ............ | 370/252 |
| 2008/0123532 | A1* | 5/2008 | Ward et al. .................... | 370/238 |

OTHER PUBLICATIONS

Data Center Bridging, Task Group of IEEE 802.1 "IEEE P802.1Qau/ D1.2", IEEE P802.1Qau/D1.2 Aug. 8, 2008, Draft Standard for Local and Metropolitan Area Networks,(Aug. 8, 2008),66 pgs.
Thaler, Pat "IEEE 802.1Qau Congestion Notification", http://www.ieee802.org/1/files/public/docs2006/au-thaler-802- 1CNforIETF-061106.pdf, IEEE 802.1 Congestion Management Chair,(2006),34 pgs.

* cited by examiner

*Primary Examiner* — Huy D Vu
*Assistant Examiner* — Stephen J Clawson
(74) *Attorney, Agent, or Firm* — McDermott Will & Emery LLP (57) ABSTRACT

Methods and apparatus for communicating data traffic using switch fabric dispersion are disclosed. An example apparatus includes a first tier of switch elements; and a second tier of switch elements operationally coupled with the first tier of switch elements. In the example apparatus, the first tier of switch elements is configured to receive a data packet from a source. The first tier of switch elements is also configured to route the data packet to the second tier of switch elements in accordance with a dispersion function, where the dispersion function is based on a dispersion tag associated with the data packet. The first tier of switch elements is still further configured to transmit the data packet to a destination for the data packet after receiving it from the second tier of switch elements.

19 Claims, 5 Drawing Sheets

DISPERSION ATTRIBUTES FOR SOURCE 110

| SOURCE QUEUE | DISPERSION |
|---|---|
| DATA QUEUE 112 | 20% |
| DATA QUEUE 114 | 80% |

| DESTINATION ADDRESS | VLAN ADDRESS | DISPERSION TAG | US EGRESS PORT |
|---|---|---|---|
| 320 | 330 | 340 | 350 |

| DESTINATION ADDRESS | SOURCE ADDRESS | DISPERSION TAG | PAYLOAD |
|---|---|---|---|
| 410 | 420 | 430 | 440 |

| SOURCE ADDRESS | DISPERSION TAG | MODIFIED DISPERSION ATTRIBUTES |
|---|---|---|
| 510 | 520 | 530 |

| SOURCE ADDRESS | DISPERSION TAG | THROTTLE INSTRUCTIONS |
|---|---|---|
| 610 | 620 | 630 |

NETWORK SWITCH FABRIC DISPERSION

TECHNICAL FIELD

This description relates to data and network communications.

BACKGROUND

Data communication and the use of data communication networks continue to grow at a rapid pace. As part of this growth comes a desire for ever increasing data transmission speeds as well as an increases in the volume of data traffic carried over such data networks. Various techniques may be employed in order to facilitate such increases in data communication speed as well as increases in data traffic volume.

For instance, advances in technology (e.g., semiconductor technology) allow network elements included in such data communication networks to be designed to run at faster speeds than previous network elements. Currently, data networks with one gigabit per second data rates are relatively common, while data networks with ten gigabit per second data rates are increasing in number.

As another technique for facilitating increases in data communication speed and accommodating increases in data traffic volume, network elements implemented in such data communication networks may be designed to include an increased number of data communication channels (ports) for communicating data into and out of the network elements.

One such network element that may use such approaches is a data network switch fabric. Such switch fabrics may be used to interconnect different leaf elements or communicate data between separate portions of a data network that are operationally connected through the data switch fabric. In other embodiments, data switch fabrics may be used to communicate data between different networks, such as a local area network and a wide area network (e.g., the Internet). By increasing the speed and number of ports used to communicate data in and out of such a network switch fabric (or other network element), the total volume of data traffic communicated through the network switch fabric, as well as the data rate of that traffic, may be increased. Such approaches, however, have drawbacks.

For instance, increasing the number of ports of a network switch fabric (or any network element) increases the cost of implementing such a network switch fabric (or network element), as additional hardware is needed to implement the additional data ports. Accordingly, each additional port added to a network element (e.g., a network switch fabric) increases the overall cost of the network element.

Also, increasing the data communication speed of each port of a network element (network switch fabric) is limited by the components that are used to implement the particular network element. For example, if a network element includes a component that is capable of operation at 1 gigabit per second data rates, such a network element cannot be operated at higher data rates. Therefore, increases in data communication rates and data traffic volume by increasing the speed of individual data port are limited by the performance characteristics of the network elements and the physical links between them.

Furthermore, even increasing the data communication speed and/or the number of ports does not insure that data communicated through a network element (e.g., network switch fabric) will be communicated efficiently. For instance, if a large volume of data is communicated over a single path of a network switch fabric, data queues used to buffer data traffic in that path may fill up, causing congestion in the network element. As a result, network entities communicating data flows on the congested path (even those not contributing to the congestion) may be instructed to reduce their data communication rates, or even halt their data flows that are being communicated over the congested path. Such a result is contrary to the objective of increasing data communication rates and data traffic volume.

SUMMARY

A system and/or method for data communication, substantially as shown in and/or described in connection with at least one of the figures, as set forth more completely in the claims.

DETAILED DESCRIPTION

Figure 1:
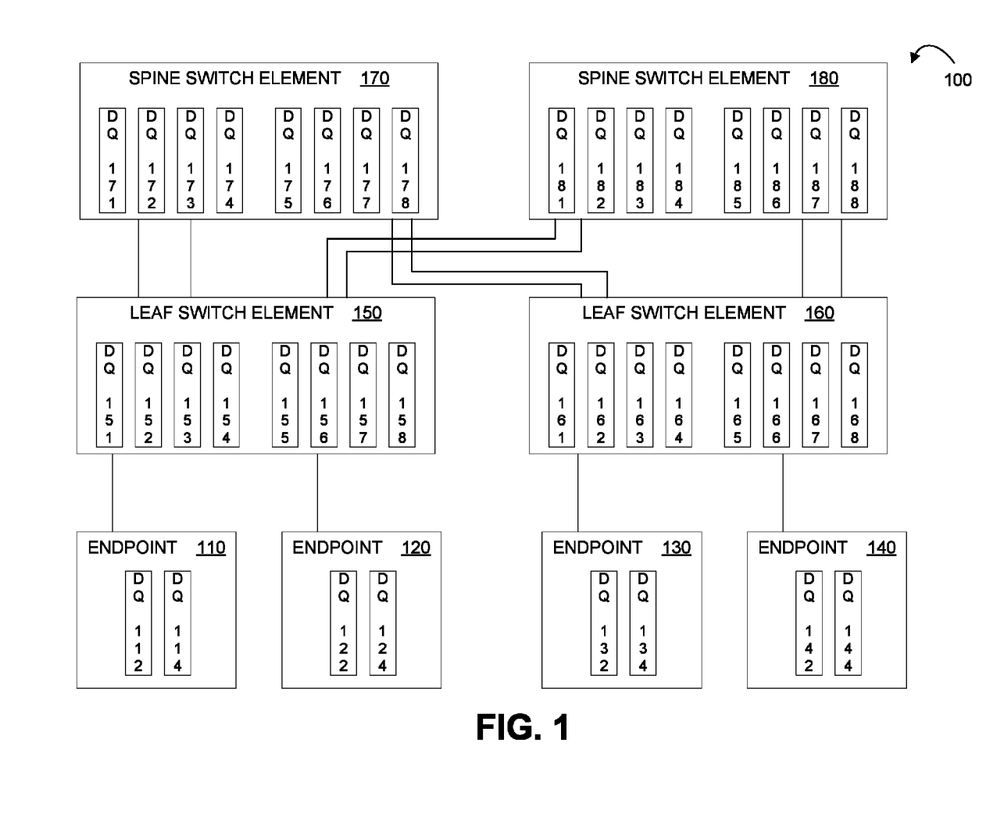
FIG. 1 is a block diagram illustrating a data network switch fabric according to an example embodiment.

FIG. 1 is a block diagram illustrating an example embodiment of a data network 100 that may be used to communicate data traffic (e.g., packet data) in accordance with a dispersion function and/or dispersion attributes. Such an approach may increase the efficiency of data communication through the network 100 (e.g., increase the effective data communication rate for such traffic, as well as increase the overall volume of data traffic communicated through the network 100). By routing data communication traffic based on such a dispersion function, the efficiency of data communication in the network 100 may be increased without increasing the number of ports of the network elements of the network 100 or increasing the data communication rates of the network elements.

The network 100 may include a plurality of endpoints 110, 120, 130 and 140. While FIG. 1 is illustrated with four endpoints, other embodiments may include fewer or additional endpoints. The endpoints in FIG. 1 may operate as either sources of data traffic being communicated in the network 100 or may operate as destinations for the data traffic communicated in the network 100. Alternatively, the endpoints 110-140 may operate as both sources and destinations.

Each of the endpoints 110, 120, 130 and 140 may include associated transmit data queues that are used to buffer data prior to communicating it into the network 100. For instance, the endpoint 110 may include transmit data queues 112 and 114. Likewise, the endpoints 120, 130 and 140 may include respective transmit data queues 122 and 124, 132 and 134 and 142 and 144. In other embodiments, the endpoints may include a different number of transmit data queues.

In an example embodiment, data dispersion across the data queues for an endpoint may be based on dispersion attributes of the endpoint. For instance, the endpoint 110 (when operating as a data traffic source) may have dispersion attributes that attempt to spread traffic evenly (symmetrically) in the network 100, as a way to increase use of the fabric capacity. Alternatively, such dispersion attributes may indicate data is to be dispersed asymmetrically. Such an approach may be used to support class of service traffic, with higher traffic categories receiving greater access to the bandwidth of the network 100.

For instance, the dispersion attributes may indicate that sixty percent of the data (lower category data) communicated into the network 100 is to be communicated using the data queue 112 (and an outbound port associated with the data queue 112) and forty percent of the data (higher category data) communicated into the network 100 is to be communicated using the data queue 114 (and an outbound port associated with the data queue 114). The dispersion attributes for a particular endpoint may depend on a number of factors. For instance, the dispersion attributes may depend on the configuration of the network 100, the type of data being communicated (e.g., class of service), among a number of other factors.

As illustrated in FIG. 1, the network 100 may include a network switch fabric for routing data between network leaf elements or separate networks. In the network 100, the endpoints 110 and 120 may be included in a first network, while the endpoints 130 and 140 may be included in a second network. The network switch fabric may be configured to locally switch (route) data traffic within a network, for example, from the endpoint 110 to the endpoint 120. The network switch fabric may also be configured to switch data traffic between the first network and the second network, such as between the endpoint 110 and the endpoint 130. The network 100, in other embodiments, may include additional endpoints that are included in additional networks and the switch fabric may be further configured to switch data traffic between these networks as well.

In the network 100, the network switch fabric may include a first tier of network elements that are operationally coupled with the endpoints 110, 120, 130 and 140. For instance, the first tier of network switch elements may include a first leaf switch element 150 and a second leaf switch element 160. Network switch fabrics, such as the switch fabric illustrated in FIG. 1, may be referred to as having a "tree structure" or "fat-tree structure." The term "leaf," when describing such a network switch fabric, may refer to points of data ingress and egress for the switch fabric.

As shown in FIG. 1, the leaf element 150 may be operationally coupled with the endpoints 110 and 120, while the leaf element 160 may be operationally coupled with the endpoints 130 and 140. It will be appreciated that the network 100 may include additional leaf elements that are coupled with a plurality of other endpoints. Also, additional endpoints may be coupled, respectively, with the leaf elements 150 and 160.

As illustrated in FIG. 1, the leaf element 150 may include a plurality of egress data queues 151-158. Likewise, the leaf element 160 may also include a plurality of egress data queues 161-168. In other embodiments, the leaf elements 150 and 160 may include fewer or additional data queues. In the network 100, the data queues of the leaf elements 150 and 160 may be used to buffer data communicated from one or more of the endpoints 110, 120, 130 and 140. Alternatively, the data queues of the leaf elements 150 and 160 may be used to buffer data that is to be communicated to one or more of the endpoints 110, 120, 130 and 140.

The network 100 may further include a second tier of switch elements that are operationally coupled with the first tier of switch elements. For instance the second tier of switch elements may include a first spine switch element 170 and a second spine switch element 180. In like fashion as the first tier of switch elements, the network 100 may include additional spine elements. A spine element may receive data traffic from one leaf element and route (switch) the data traffic to another leaf element for communication to a destination endpoint associated with the data traffic. In the network 100, the spine elements 170 and 180 act as the "trunk" of the "fat-tree structure."

As shown in FIG. 1, each of the spine elements 170 and 180 may be coupled with each of the leaf elements 150 and 160 to allow for data switching between any of the endpoints 110, 120, 130 and 140. In embodiments including additional leaf and/or spine elements, each spine element may be coupled with each of the leaf elements in order to facilitate switching data traffic between endpoints that are coupled with the data switch fabric (e.g., via the first tier of switch elements).

In the network 100, when switching data traffic between a first endpoint connected with a first leaf elements and a second endpoint connected with a second leaf element, the first tier of switch elements may be configured to receive a data packet from the first endpoint (operating as a data source) and route the data packet through the switch fabric (via the second tier of switch elements) to the second endpoint (operating as a destination). Such routing (switching) of the data packet may be based on a dispersion function or dispersion attributes included in the first tier of switch elements, as well as dispersion attributes included in the source endpoint. Further, the dispersion function may be based on a dispersion tag associated with the data packet. In an example embodiment, the dispersion tag may be included in the packet by the endpoint. In another example embodiment, the dispersion tag may be included in the data packet by the leaf element (of the first tier of switch elements) at which the packet is received. Such a dispersion tag may include, for example, an indication of which data queue of the endpoint the data packet was transmitted from. The dispersion function may be further based on the combination of the endpoint destination address and the dispersion tag. This approach may be particularly useful if, due to link or switch failures, some endpoints become unreachable through a specific spine element.

As an example, the leaf element 150 may receive a data packet from the endpoint 110 that is being transmitted to endpoint 130. The endpoint 110 may route the packet to the leaf element 150 in accordance with dispersion attributes included in the endpoint 110. Further, the endpoint 110 may insert a dispersion tag in the data packet, where the dispersion tag indicates the egress port of the endpoint 110 on which the data packet is routed. In this example, there would be two possible values for a dispersion tag inserted by the endpoint 110, one corresponding with each transmit queue. In an example embodiment, the dispersion tag may be assigned a value of "0" for transmit queue 112 and a value of "1" for transmit queue 114. Of course, other forms of dispersion tags are possible. Alternatively, the leaf element 150 may insert the dispersion tag based on one or more headers of the data packet and the available resources of the leaf element 150.

After receiving the data packet from the endpoint 110, the leaf element 150 may then route the data packet to the second tier of switch elements, such as to the spine element 170, in accordance with a dispersion function or dispersion attributes of the leaf element 150. As was discussed above, the dispersion function may be based on a dispersion tag associated with (included in) the data packet, such as inserted by the endpoint 110 or the leaf element 150 in this example. For instance, the dispersion function may associate the dispersion tag in combination with an address of the endpoint source with a particular upstream egress port of the leaf element. Dispersion attributes and dispersion function tables are discussed further with respect to FIG. 3 below.

After the packet is received at the spine element 170, the spine element 170 may then route the packet back to the first tier of switch elements (i.e., the leaf element 160) in accordance with a routing table. For example, the routing table may associate a destination address of the packet with a particular downstream egress port of the spine element 170. Alternatively, a module ID and port ID (corresponding with particular resources of the switch fabric) may be included in the packet by the leaf element 150 and the routing table may associate the module ID and port ID with an egress port of the spine element 170 for communicating the packet to the leaf element 160. After receiving the packet from the spine element 170, the leaf element 160 may route the packet to the endpoint 130 (its destination) using routing tables such as those described above and discussed in further detail below with respect to FIG. 7.

Figure 2:
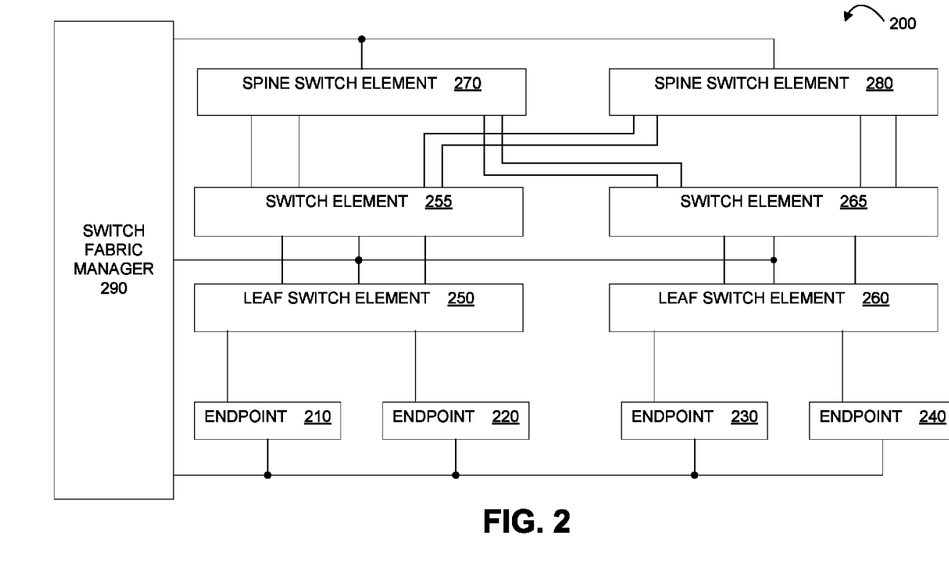
FIG. 2 is a block diagram illustrating a data network switch fabric according to another example embodiment.

FIG. 2 is a block diagram illustrating a network 200 in which data traffic can be communicated according dispersion attributes and/or dispersion functions. Furthermore, dispersion notification messages may be used in the network 220 (as well as the network 100) to instruct the source endpoints to rebalance their data traffic dispersion to reduce or prevent data congestion for upstream traffic in the network 200. Additionally, congestion notification messages may be used in the network 200 (as well as the network 100) to instruct source endpoints to reduce data rates (including halting or pausing) for data flows causing data congestion for downstream data traffic in the network 200.

The network 200 may include a plurality of endpoints 210, 220, 230 and 240. The network 200 may also include a switch fabric that includes three tiers of switch elements. The switch fabric of the network 200 may include a first tier of leaf elements including leaf elements 250 and 260. The switch fabric of the network 200 may further include a second tier of switch elements including switch elements 255 and 265. Additionally, the switch fabric of the network 200 may include a third tier of switch elements including spine elements 270 and 280.

In the network 200, data traffic may be routed in similar fashion as described above with respect to FIG. 1. For instance, upstream traffic may be routed in accordance with dispersion attributes and/or dispersion functions implemented in tables, while downstream traffic may be routed based on routing tables, such as those previously described and discussed further below with respect to FIG. 7. It will be appreciated while FIGS. 1 and 2 illustrate switch fabrics with two and three tiers of switch elements, such switch fabrics may include additional tiers of switch elements. By increasing the number of tiers of switch elements (and the number of switch elements in each tier) the number of endpoints that can be serviced by a switch fabric may be increased.

The network 200 further includes a switch fabric manager 290 that is coupled with each of the elements of the network. In the network 200, the switch fabric manager 290 may determine the configuration of the network 200 including the resources of each of the elements of the network 200. Based on the configuration of the network 200, the switch fabric manager 290 may determine dispersion attributes, dispersion function tables and/or routing tables (collectively "routing information") for the elements of the network 200. After determining the routing information for each element of the network 200, the switch fabric manager 290 may communicate the respective routing information to each element. For instance, the switch fabric manager may communicate respective dispersion attributes to each of the endpoints 210-240, respective dispersion tables to the leaf elements 250 and 250 and the switch elements 255 and 265, and respective routing tables to the spine elements 270 and 280, the leaf elements 250 and 260, and the switch elements 255 and 265.

The switch fabric manager 290 may also dynamically manage the network 200. For instance, if any of the elements of the network 200 become unavailable, such as due to device failure or physical link failure, the switch fabric manager 290 may generate new routing information based on the unavailability of one or more elements of the network 200. The new routing information may then be distributed to respective elements of the network 200 to facilitate routing data traffic in the network 200 in view of the unavailability of one or more elements.

Furthermore, the switch fabric manager 290 may modify routing information in the network 200 based on notifications of congestion in the network 200. For instance, if data congestion occurs for upstream data traffic in the network 200, the network element experiencing the upstream congestion may send a dispersion notification message to the switch fabric manager 290 to indicate the congestion, including information identifying a data flow associated with the congestion. In response to the dispersion notification message, the switch fabric manager 290 may modify the routing information in order to rebalance the traffic dispersion for upstream data traffic in the network 200. The switch fabric manager 290 may then supply the updated routing information reflecting the rebalanced traffic dispersion to any corresponding network elements affected by the change(s) in the routing information. The updated dispersion information may take a number of forms. For instance, a dispersion notification message may be used that includes updated dispersion attributes, such as the message illustrated in FIG. 5. Alternatively, as another example, a new dispersion table may be provided that reflects the updated dispersion information.

Figure 3A:
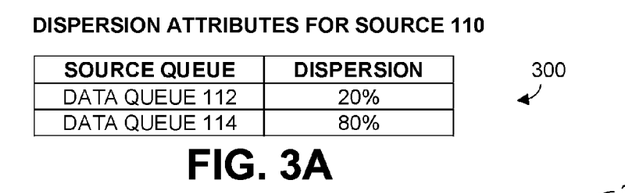
FIG. 3A is a table and FIG. 3B is a diagram illustrating, respectively, network switch-fabric dispersion attributes for routing data traffic and a dispersion table entry according to example embodiments.

FIG. 3A is a table 300 illustrating example dispersion attributes for the endpoint 10 shown in FIG. 1. In FIG. 3A, the first column may indicate the data queue of the endpoint 10 and the second column may indicate the percentage of traffic that is to be communicated using the corresponding transmit queue and associated egress port. For instance, in the table 300, the dispersion attributes indicate that twenty percent of the data traffic communicated by the endpoint 10 is to be communicated via data queue 112 and its associated egress port, while eighty percent of the data communicated by the endpoint 10 is to be communicated via the data queue 114 and its associated egress port. As noted above, these dispersion attributes may be dynamically modified in response to upstream data congestion in an associated data switch fabric (such as illustrated in FIGS. 1 and 2). The changes may be determined by a data switch fabric manager or, alternatively, by the element detecting the upstream congestion. As discussed above, and in further detail below with respect to FIG. 5, modified dispersion attributes generated in response to the congestion may be included in a dispersion notification message received from a switch element or, alternatively, from a switch fabric manager.

Figure 3B:
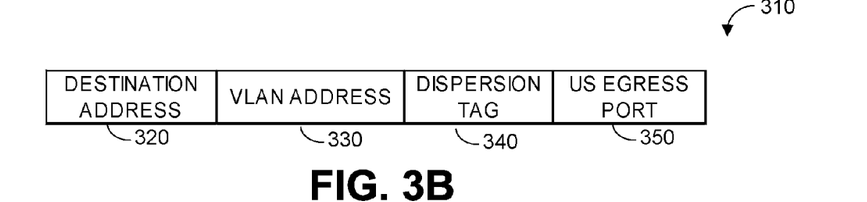

FIG. 3B is a diagram illustrating an example dispersion table entry 310. The entry 310 may be one of a number of entries included in a dispersion table. The entries of such a dispersion table may be generated (e.g., by a switch fabric manager) in accordance with a dispersion function or dispersion attributes. The number of entries in such a dispersion table may depend, at least in part, on the configuration of an associated data network. For instance, if a leaf element includes four egress ports and the dispersion function indicates symmetrical dispersion of data traffic across the four egress ports, the dispersion table would be generated such that twenty-five percent of the entries of the table correspond with each egress port. A similar approach may be employed for asymmetric dispersion, where the percentage of dispersion table entries corresponding with a given egress port is consistent with the amount of traffic (dispersion) associated with that egress port in a corresponding dispersion function. For example, if the dispersion attributes for a leaf element with four egress ports were defined as 40% for a first port, 40% for a second port, 10% for a third port and 10% for a fourth port, an associated dispersion table would have 40% of its entries associated with the first port, another 40% associated with the second port, 10% associated with the third port and another 10% associated with the fourth port.

The dispersion table entry 310 illustrated in FIG. 3B may include a destination address 320 (e.g., an Ethernet or IP address) of an endpoint to which data is being communicated. The entry 310 may also include a virtual local area network (VLAN) address 330 for the destination endpoint. The entry 300 may further include a dispersion tag 340, such as previously discussed. Also, the entry 310 may include a designation of an upstream egress port that is associated with the other fields of the entry 300. When a packet arrives at a leaf element, the leaf element may examine the packet to determine the destination address, the VLAN address and the dispersion tag of the packet. Based on this information, the leaf element may determine the egress port associated with the packet in the dispersion table and appropriately route the packet toward the spine of a switch fabric using the egress port indicated in the appropriate dispersion table entry.

Figure 4:
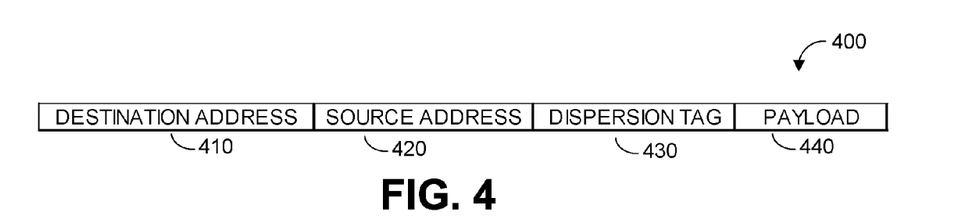
FIG. 4 is a diagram illustrating a packet including a dispersion tag according to an example embodiment.

FIG. 4 is a diagram illustrating a data packet that includes a dispersion tag in accordance with an example embodiment. The example packet 400 may include a destination address field 410 that indicates a destination endpoint for the data packet 400. The destination address field 410 may take a number of forms. For example, the destination address field 410 may include a MAC address, an Internet Protocol (IP) address, or another network address form that is appropriate for a network in which the data packet is being communicated. The data packet 400 may further include a source address field 420. The source address included in the source address field 420 may indicate a source endpoint from which the data packet 400 was transmitted. As with the destination address field 410, the source address field may include a MAC address, an IP address or an address that is appropriate for the network that is used to communicate the data packet 400.

The data packet 400 may further include a dispersion tag field 430. The dispersion tag field 430 may include a dispersion tag, such as previously discussed, that indicates a path for the data packet 400 from the source endpoint to a corresponding spine element of a data switch fabric (via one more intervening tiers of switch elements). For example, the path for the data packet 400 may be defined by dispersion attributes included in each of the source endpoints and the leaf elements. The dispersion attributes may be implemented in one or more tables included in the network elements and may indicate which respective ports of each network element should be used to communicate the data packet 400. The data packet 400 may further include a payload field, which may include the data portion of the data packet 400.

Figure 5:
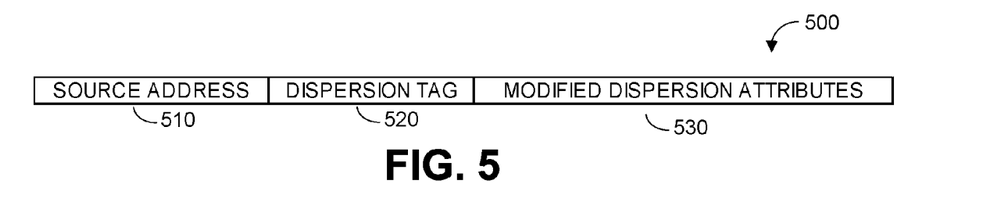
FIG. 5 is a diagram illustrating a dispersion notification message according to an example embodiment.

FIG. 5 is a diagram illustrating an example embodiment of a dispersion notification message 500 that may be sent in response to data congestion data traffic for data traffic traveling into a data switch fabric. As an example, referring to FIG. 1, data congestion may be detected in one of the data queues 151-158 of the leaf switch element 150 for data being communicated from the endpoint 110 to the endpoint 130. Such data traffic (i.e., from an endpoint toward the spine of a switch fabric) may referred to as traveling "up" the switch fabric. Such congestion detection may be accomplished by monitoring data occupancy levels in each of the data queues 151-158 and comparing the data occupancy levels with a congestion threshold level. If the data occupancy level of a queue exceeds its threshold limit, the leaf element 150 may determine that data congestion is present.

In the event the leaf element 150 detects congestion for "up" traffic, the leaf element 150 may examine data packets in the queue to determine the cause of the congestion. In a data network using packets in the form of the data packet 400 described above with respect to FIG. 4, the leaf element may determine that data being communicated on a path associated with a particular dispersion tag is causing the congestion. The leaf element may make this determination based on the source addresses and dispersion tags of packets buffered in the congested data queue.

In response to detecting the congestion and the determination of the source of the congestion, the leaf element 150 may generate the dispersion notification message 500 and communicate the dispersion notification message 500 to the endpoint (source) that is responsible for the congestion. For example, as shown in FIG. 5, the dispersion notification message may include a source address field 510 that includes an address of the endpoint that contributes to the congestion. The source address included in the dispersion notification message 500 may be used to route the dispersion notification message to the source causing the congestion.

The congestion notification message 500 may also include a dispersion tag field 520 that includes the dispersion tag corresponding with the data traffic that is causing the congestion. The dispersion tag included in the dispersion tag field 520 may correspond with a particular path in the switch fabric. The leaf element 150 may also include modified dispersion attributes in a modified dispersion attributes field 530 of the dispersion notification message 500. The modified dispersion attributes may include new dispersion attributes for the source causing the congestion. The leaf element 150 may determine the modified dispersion attributes based on the data occupancy of each of its data queues 151-158. For instance, if particular data queues of the leaf element 150 have very low or no data occupancy, the leaf element 150 may include modified dispersion attributes that instruct the source responsible for the congestion to rebalance its data traffic transmission to more effectively utilize the data queues with low or no data occupancy.

After generating the dispersion notification message 500, the leaf element 150 may then communicate the dispersion notification message 500 to the source address 510. The endpoint corresponding with the source address 510 may receive the dispersion notification message 500 and rebalance its data traffic based on the dispersion tag 520 and/or the modified dispersion attributes. As an example, if an endpoint that is causing congestion is communicating data traffic to a leaf element over two data ports, the endpoint may rebalance its traffic dispersion (e.g., based on the modified dispersion attributes) to reduce the percentage of data traffic communicated over the port associated with the congestion. Note that rebalancing of traffic dispersion only affects the choice of spine through which the traffic is sent but does not change the endpoints involved in such data communication. This approach allows rebalancing without having to change the mapping function at the switch, nor the flow attributes at the endpoints, only the traffic dispersion at the source endpoints.

It will be appreciated that other approaches for communicating the dispersion notification message 500 to a source responsible for data congestion are possible. For instance, referring to the network 200 in FIG. 2, the switch fabric manager 290 may receive notification that congestion is occurring from a leaf element of the network 200. In response to the notification of congestion from the leaf element, the switch fabric manager may determine the modified dispersion attributes 530 and may communicate those modified dispersion attributes to the endpoint causing the congestion in form of a dispersion notification message 500. As an alternative, the switch fabric manager may communicate the modified dispersion attributes to the endpoint responsible for the congestion in the form of a new dispersion function implemented in a table, such as the table 300 discussed above with respect to FIG. 3A.

Figure 6:
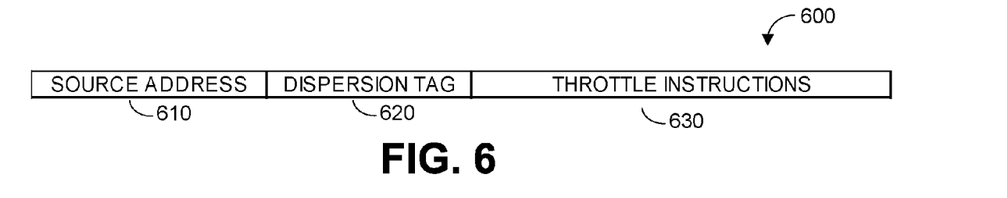
FIG. 6 is a diagram illustrating a congestion notification message according to an example embodiment.

FIG. 6 is a diagram illustrating an example embodiment of a congestion notification message 600 that may be sent in response to data traffic congestion for data traffic traveling out of a data switch fabric. As an example, referring to FIG. 1, data congestion may be detected in one of the data queues 161-168 of the leaf switch element 150 for data being communicated from the endpoint 110 to the endpoint 130. Such data traffic (i.e., from the spine of a switch fabric toward an endpoint) may referred to as traveling "down" the switch fabric. Such congestion detection may be accomplished in like fashion as described with respect to FIG. 5, by monitoring data occupancy in each of the data queues 161-168 and comparing the data occupancy levels with a congestion threshold level. If the data occupancy level of a queue exceeds its threshold limit, the leaf element 160 may determine that data congestion is present.

In the event that the leaf element 160 detects congestion for "down" traffic, the leaf element 160 may examine data packets in the queue to determine the cause of the congestion. In a data network using packets in the format of the packet 400 described above with respect to FIG. 4, the leaf element 160 may determine that data being communicated on a path associated with a particular source endpoint is causing the congestion. The leaf element may make this determination based on the source addresses, the dispersion tags and/or the destination addresses of packets buffered in the congested data queue.

In response to detecting the congestion and the determination of the source of the congestion, the leaf element 160 may generate the congestion notification message 600 and communicate the congestion notification message 600 to the endpoint (source) that is responsible for the congestion. For example, as shown in FIG. 6, the congestion notification message 600 may include a source address field 610 that includes an address of the endpoint that is responsible for the congestion. The source address included in the congestion notification message 600 may be used to route the congestion notification message 600 to the source causing the congestion.

The congestion notification message 600 may also include a dispersion tag field 620 that includes the dispersion tag corresponding with the data traffic that is causing the congestion. The dispersion tag included in the dispersion tag field 620 may correspond with a particular data path in the switch fabric. The leaf element 160 may also include throttling instructions in a throttling instructions field 630 of the congestion notification message 600. For instance, the throttling instructions may indicate that the source (endpoint) causing the congestion should reduce the data rate of a data flow associated with the congestion. Alternatively, the throttling instructions may indicate that that the data flow causing the congestion should be halted or paused.

After generating the congestion notification message 600, the leaf element 160 may then communicate the congestion notification message 600 to the source address indicated in the source address field 610. The endpoint corresponding with the source address 610 may receive the congestion notification message 600 and throttle the data flow causing the congestion in accordance with the throttling instructions indicated in the congestion notification message 600.

It will be appreciated that other approaches for communicating the congestion notification message 600 to a source (endpoint) responsible for data congestion are possible. For instance, referring to the network 200 in FIG. 2, the switch fabric manager 290 may receive notification from a leaf element that congestion is occurring for "down" traffic. In response to the notification from the leaf element, the switch fabric manager may determine appropriate throttling instructions and communicate those throttling instructions to the endpoint causing the congestion in the form of a congestion notification message.

Figure 7A:
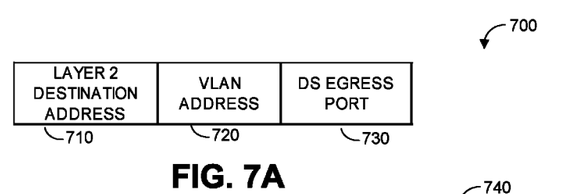
FIGS. 7A and 7B are diagrams illustrating routing table entries for routing data traffic according to an example embodiment.

FIG. 7A is a diagram illustrating an example routing table entry 700 for routing downstream data traffic in a switch fabric, such as illustrated in FIGS. 1 and 2. As with the dispersion table entry 300, a number of routing table entries 700 may be included in a downstream routing table included in a spine element and/or a leaf element of a data switch fabric. In an example embodiment, the entry 700 may include an IP layer 2 destination address 710 and a VLAN destination address 720. The destination address 710 and the VLAN address 720, in the entry 700, are associated with a downstream egress port 730 based on the configuration of the network. For instance, for packets arriving at leaf element 160 in the network 100 where the packet header indicates a destination address and/or VLAN address for the endpoint 130, the corresponding routing table entry 710 will indicate the egress port of the leaf element 160 that is coupled with the endpoint 130. Using another egress port would improperly route the packet and result in data loss, thus negatively affecting the efficiency of the network 100.

Figure 7B:
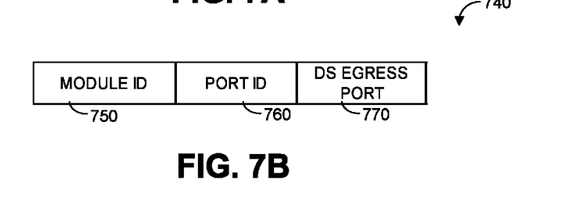

FIG. 7B is a diagram illustrating another example routing table entry 740. The routing table entry 740 may include a module ID 750 and port ID 760, where the module ID corresponds to a particular egress leaf element and the port ID indicates the egress port to use to communicate data packets having matching mode IDs and port IDs. The mode ID and port ID can be determined as part of the routing lookups performed during upstream communication of data packets in a switch fabric.

For instance, when a packet is received from a source endpoint, the leaf element receiving the packet may route the packet in accordance with a dispersion table included in the leaf element. Additionally, the leaf element may also associate a layer 2 destination address and VLAN address of the packet with a module ID and port ID for downstream routing of the packet in the switch fabric. The leaf element may append the module ID and port ID information to the packet (e.g., in a header, for example). Spine and leaf elements may then use the appended module ID and port ID information for downstream routing of the packet, without the need to do a layer 2 lookup, which can be time consuming. It will be appreciated that the dispersion tables, layer 2 lookup tables and routing tables described herein may be implemented as individual tables or in any appropriate combination as integrated tables.

Figure 8:
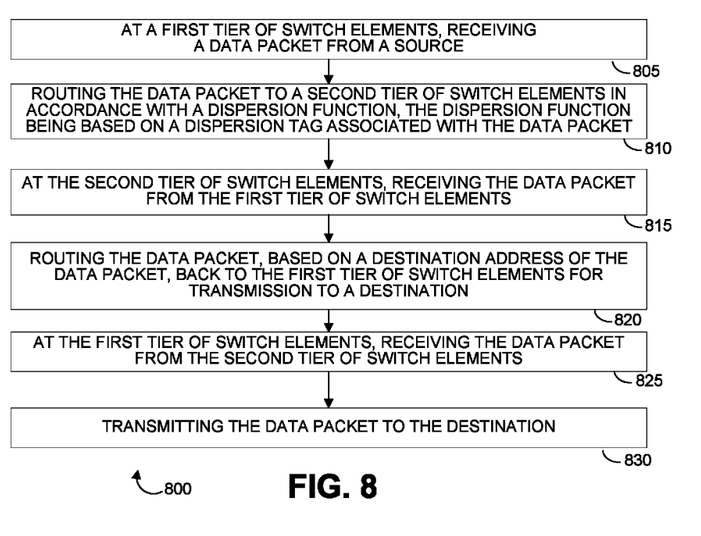
FIG. 8 is a flowchart illustrating a method for data communication using network switch-fabric dispersion according to an example embodiment.

FIG. 8 is a flowchart illustrating an example embodiment of a method for data communication in a network switch fabric using a fabric dispersion function. The method 800 may be implemented, for example, in the network 100 illustrated in FIG. 1, in the network 200 illustrated in FIG. 2, or in a number of other appropriate network configurations. The method 800 may include, at block 805 receiving, at a first tier of switch elements, a data packet from a source. For instance, the data packet may be received from the source (an endpoint) at a leaf switch element included in the first tier of switch elements.

The method 800 may further include, at block 810, routing the data packet to a second tier of switch elements in accordance with a dispersion function. As was previously discussed, the dispersion function and associated routing may be based on a dispersion tag included in the data packet. In an example embodiment, the dispersion tag may be inserted in the data packet by the source of the data packet. In another example embodiment, the dispersion tag may be inserted in the data packet by the leaf element that receives the packet. As was noted above, the form of the dispersion tag may vary depending on the network entity that generates the dispersion tag. For instance, the dispersion tag may be generated based on dispersion attributes of the source endpoint that transmitted the data packet. Alternatively, the dispersion tag may be generated based on dispersion attributes of the leaf element that receives the data packet from the source.

The method 800 may also include, at block 815, at the second tier of switch elements, receiving the data packet from the first tier of switch elements. At block 830, the method 800 may include routing the data packet back to the first tier of switch elements, based on a destination address of the data packet, for transmission to a destination. As discussed above, routing the data packet back to the first tier of switch elements may, alternatively, be based on a module identification tag corresponding with the packet. At block 825, the method 800 may include receiving, at the first tier of switch elements, the data packet from the second tier of switch elements. The method 800, at block 830, may also include transmitting the data packet from the first tier of switch elements to a destination. Transmitting the data packet to the destination may be based on a destination address (e.g., a MAC address or IP address) included in the packet.

Figure 9:
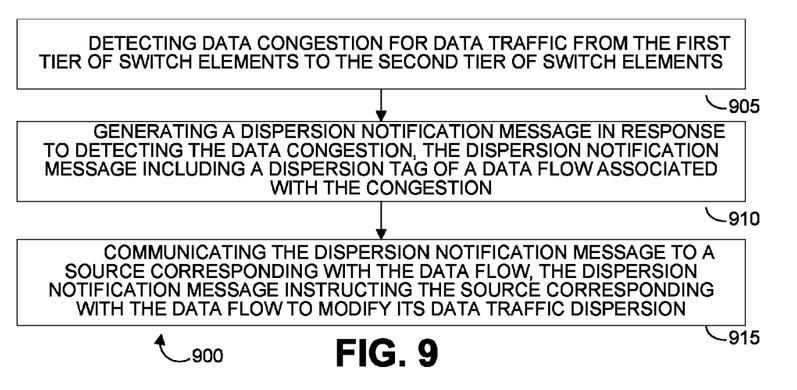
FIG. 9 is a flowchart illustrating a method for communicating a dispersion notification message according to an example embodiment.

FIG. 9 is a flowchart illustrating an example embodiment of a method 900 for modifying the dispersion attributes for data traffic causing congestion in an "up" direction in a network switch fabric. In like fashion as the method 800 illustrated in FIG. 8, the method 900 may be may be implemented in the network 100 illustrated in FIG. 1, in the network 200 illustrated in FIG. 2, or in a number of other appropriate network configurations. With reference to FIG. 1, the method 900 may include, at block 905, detecting data congestion for data traffic from the first tier of switch elements (leaf elements) to the second tier of switch elements (spine elements). As discussed above, data congestion may be detected by monitoring data occupancy levels in data queues of the elements of a data switch fabric. In the event the data occupancy of a queue exceeds the queue's data occupancy threshold, this may indicate to a corresponding network element that data congestion is present.

At block 910, the method 900 may include generating a dispersion notification message in response to detecting the data congestion. In an example embodiment, the dispersion notification message may take the form of the dispersion notification message 500 shown in FIG. 5. For instance, the dispersion notification message at block 910 may include a dispersion tag of a data flow associated with the congestion. As previously discussed, the network element that detects data congestion may examine the data packets that are buffered in the congested data queue to determine a cause of the congestion, such as data communicated from a specific endpoint over a specific path in the data switch fabric.

At block 915, the method 900 may include, communicating the dispersion notification message to a source corresponding with the data flow causing the congestion. As previously discussed with respect to FIG. 5, the dispersion notification message may instruct the source corresponding with the data flow causing the congestion to modify its data traffic dispersion in order to alleviate the data congestion.

Figure 10:
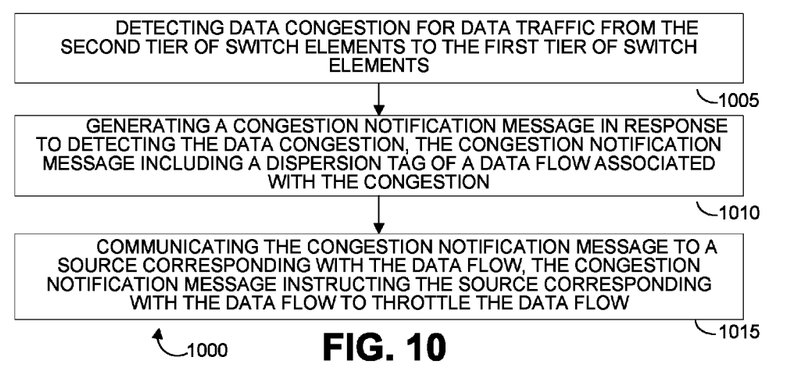
FIG. 10 is a flowchart illustration a method for communicating a congestion notification message according to an example embodiment.

FIG. 10 is a flowchart illustrating an example embodiment of a method 1000 for throttling data traffic causing congestion in a "down" direction in a network switch fabric. In like fashion as the methods 800 and 900 illustrated, respectively, in FIGS. 8 and 9, the method 1000 may be may be implemented in the network 100 illustrated in FIG. 1, in the network 200 illustrated in FIG. 2, or in a number of other appropriate network configurations. With reference to FIG. 1, the method 1000 may include, at block 1005, detecting data congestion for data traffic from the second tier of switch elements (spine elements) to the first tier of switch elements (leaf elements). As discussed above, data congestion may be detected by monitoring data occupancy levels in data queues of the elements of a data switch fabric. In the event the data occupancy of a queue exceeds the queue's data occupancy threshold, this may indicate to a corresponding network element that data congestion is present.

At block 1010, the method 1000 may include generating a congestion notification message in response to detecting the data congestion. In an example embodiment, the congestion notification message may take the form of the congestion notification message 600 shown in FIG. 6. For instance, the congestion notification message may include a dispersion tag of a data flow associated with the congestion. As previously discussed, the network element that detects data congestion may examine the data packets that are buffered in the congested data queue to determine a cause of the congestion, such as data communicated from a specific endpoint over a specific path in the data switch fabric.

At block 1015, the method 1000 may include communicating the congestion notification message to a source (endpoint) corresponding with the data flow causing the congestion. As previously discussed with respect to FIG. 6, the congestion notification message may instruct the source corresponding with the data flow causing the congestion to throttle the data flow.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
   at a first tier of switch elements, receiving a plurality of data packets from a source;
   routing the plurality of data packets to a second tier of switch elements in accordance with a dispersion function, the dispersion function being based on respective dispersion tags associated with each of the plurality of data packets and specifying a percent of data traffic to be routed on a given path;
   at the second tier of switch elements, receiving the plurality of data packets from the first tier of switch elements;
   routing the plurality of data packets, based on respective destination addresses of the plurality of data packets, back to the first tier of switch elements for transmission to respective destinations;
   at the first tier of switch elements, receiving the plurality of data packets from the second tier of switch elements;
   transmitting the data packet to the respective destinations;
   detecting data congestion for data traffic from one of the first or second tier of switch elements to the other of the first or second tier of switch elements;
   generating a notification message in response to detecting the data congestion, the notification message including a dispersion tag of a data flow associated with the congestion; and
   communicating the notification message to a source corresponding with the data flow, the notification message instructing the source corresponding with the data flow to modify the data traffic.

2. The method of claim 1, wherein the respective dispersion tags are included in the plurality of data packets by the source.

3. The method of claim 1, further comprising generating, at the first tier of switch elements, the respective dispersion tags based on one or more respective headers of the plurality of data packets.

4. The method of claim 1, wherein:
   the detected data congestion is for data traffic from the first tier of switch elements to the second tier of switch elements,
   the notification message is a dispersion notification message, and
   to modify its data traffic dispersion.

5. The method of claim 1, wherein:
   the detected data congestion is for data traffic from the second tier of switch elements to the first tier of switch elements,
   the notification message is a congestion notification message, and
   to modify the data traffic is to throttle the data flow.

6. A network switch-fabric comprising:
   a first tier of switch elements;
   a second tier of switch elements operationally coupled with the first tier of switch elements, wherein:
   the first tier of switch elements is configured to:
     receive a plurality of data packets from a source;
     route the plurality of data packets to the second tier of switch elements in accordance with a dispersion function, the dispersion function being based on respective dispersion tags associated with each of the plurality of data packets and specifying a percent of data traffic to be routed on a given path; and
     transmit the plurality of data packets to respective destinations; and
   the second tier of switch elements is configured to:
     receive the plurality of data packets from the first tier of switch elements; and
     route the plurality of data packets, based on respective destination addresses of the plurality of data packets, back to the first tier of switch elements for transmission to the destination respective destinations; and
wherein the network switch-fabric is collectively configured to:
detect data congestion for data traffic from one of the first or second tier of switch elements to the other of the first or second tier of switch elements;
generate a notification message in response to detecting the data congestion, the notification message including a dispersion tag of a data flow associated with the congestion; and
communicate the notification message to a source corresponding with the data flow, the notification message instructing the source corresponding with the data flow to modify the data traffic.

7. The network switch-fabric of claim 6, further comprising a third tier of switch elements operationally coupled between the first tier of switch elements and the second tier of switch elements, the third tier of switch elements being configured to:
route the plurality of data packets from the first tier of switch elements to the second tier of switch elements based on the dispersion function; and
route the plurality of data packets from the second tier of switch elements to the first tier of switch elements based on the respective destination addresses.

8. The network switch-fabric of claim 6, wherein the respective dispersion tags are included in the plurality of data packets by the source in accordance with a set of dispersion attributes of the source.

9. The network switch-fabric of claim 6, wherein the first tier of switch elements is further configured to generate respective dispersion tags based on one or more respective headers of the plurality of data packets.

10. The network switch-fabric of claim 6, wherein the
detected data congestion is for data traffic from the first tier of switch elements to the second tier of switch elements
the notification message is a dispersion notification message and to modify the data traffic is to modify its data traffic dispersion.

11. The network switch-fabric of claim 6, wherein the
detected data congestion is for data traffic from the second tier of switch elements to the first tier of switch elements
the notification message is a congestion notification message and to modify the data traffic is to throttle the data flow.

12. The network switch-fabric of claim 11, wherein throttling the data flow associated with the congestion includes one of the following: reducing a data rate of the data flow, pausing the data flow and stopping the data flow.

13. The network switch-fabric of claim 6, wherein the first tier of switch elements includes a plurality of switch elements.

14. The network switch-fabric of claim 6, wherein the second tier of switch elements includes a plurality of switch elements.

15. The network switch-fabric of claim 6, wherein the dispersion function is implemented in a table, the table associating dispersion tags with corresponding fabric ports of the first tier of switch elements.

16. The network switch-fabric of claim 6, wherein the second tier of switch elements routes the plurality of data packets to the first tier of switch elements based on a table associating module identifiers (IDs) with corresponding fabric ports of the second tier of switch elements, the module IDs being determined by the first tier of switch elements.

17. The network switch-fabric of claim 6, further comprising a switch-fabric manager operationally coupled with the first tier of switch elements and the second tier of switch elements, the switch-fabric manager being configured to:
dynamically determine a configuration of the network switch-fabric;
determine one or more dispersion functions for the first tier of switch elements;
communicate the one or more dispersion functions to the first tier of switch elements;
determine one or more routing tables for the second tier of switches; and
communicate the one or more routing tables to the second tier of switch elements.

18. A system comprising:
a packet data source;
a first tier of switch elements operationally coupled with the source;
a second tier of switch elements operationally coupled with the first tier of switch elements
wherein:
the packet data source is configured to:
queue a plurality of data packets for transmission to the first tier of switch elements;
tag the plurality of data packets using respective dispersion tags, the queuing and tagging being done in accordance with a set of dispersion attributes for the source; and
transmit the plurality of data packets to the first tier of switch elements;
the first tier of switch elements is configured to:
receive the plurality of data packets from the source;
route the plurality of data packets to the second tier of switch elements in accordance with a dispersion function, the dispersion function being based on the respective dispersion tags and implemented in a table, the dispersion function specifying a percent of data traffic to be routed on a given path, the table associating each of the respective dispersion tags with a corresponding fabric port of the first tier of switch elements; and
transmit the plurality of data packets to respective destinations for the plurality of data packets;
the second tier of switch elements is configured to:
receive the plurality of data packets from the first tier of switch elements; and
route the plurality of data packets, based on respective destination of the plurality of data packets, back to the first tier of switch elements for transmission to the respective destinations; and
wherein the system is collectively configured to:
detect data congestion for a data traffic flow from the first tier of switch elements to the second tier of switch elements;
generate a dispersion notification message in response to detecting the data congestion, the dispersion notification message including a dispersion tag associated with the data flow; and
communicate the dispersion notification message to the source, the dispersion notification message instructing the source to modify its dispersion attributes.

19. The system of claim 18, further comprising a switch-fabric manager operationally coupled with the first tier of switch elements, the second tier of switch elements and the source, the switch-fabric manager being configured to:
dynamically determine a configuration of a network-switch fabric;
determine the dispersion function based, at least in part, on the determined configuration;

determine the dispersion attributes based, at least in part, on the determined configuration;
communicate the dispersion function to the first tier of switch elements;
communicate the dispersion attributes to the source;
determine one or more routing tables for the second tier of switches;
communicate the one or more routing tables to the second tier of switch elements;
modifying the dispersion attributes and the dispersion function in response to the dispersion notification message;
communicate the modified dispersion function to the first tier of switch elements; and
communicate the modified dispersion attributes to the source.

\* \* \* \* \*